Patented July 5, 1949

2,475,330

UNITED STATES PATENT OFFICE 2,475,330

LUMINESCENT SCREEN

Gustave Levy, Maplewood, N. J., assignor, by mesne assignments, to Philco Corporation, Philadelphia, Pa., a corporation of Pennsylvania No Drawing. Application April 12, 1946, Serial No. 661,859

5 Claims. (Cl. 250—80)

The present invention relates to a compositely formed luminescent screen suitable for use in cathode ray tubes or the like.

Luminescent screens are commonly made by settling the pulverized constituents of a luminescent material, generally held in a water suspension, onto a suitable backing such as the inner wall of a cathode ray tube face plate. In accordance with this practice no special consideration is given as to the sequence in which the several constituents of the luminescent material are settled upon the backing element. I have discovered that if the various components forming the screen are settled in a given sequence of layers having predetermined thickness, the luminescent properties of the screen may be controlled in many respects.

It is therefore an object of my invention to control the luminescent properties of a fluorescent screen by predetermining the order or sequence of deposition of the several luminescing constituents of a phosphor mixture upon a backing element.

Another object is to control the sequence of the settling of the phosphor constituents in layers giving an arrangement or pattern best adapted to secure a desired spectral and/or pictorial distribution.

Another object of the invention is to predetermine the amount of the separate phosphors constituting the phosphor mixture in order to control the thickness of the individual or separate phosphor layers with a view to obtaining the maximum resolution and contrast possible for a given operating electrical condition.

A somewhat similar object is to control the thickness of the respective layers of phosphorous constituents to secure maximum efficiency for light output of a desired color.

A further object of the invention is to effect the sequential settling of the several constituents of the luminescent material in one operation, i. e., from a common mixture by a continuous settling process.

A special object is to provide a compositely formed luminescent screen of several layers, the outer layer with respect to the backing of the screen being beryllium oxide.

Other objects and features of the invention will become manifest as the description proceeds.

To practice the present invention successfully it is only necessary to give general directions as to the constituents employed and the sequence or order of sedimentation or deposition thereof on a screen backing, as, for example, the inner wall of a cathode ray tube face plate. Since this feature is primarily accomplished by selecting phosphor and non-phosphor constituents of different densities and treating these materials so that they have a gradation in particle size, it is largely empirical as to the quantities or proportions used of said materials. However, to give some general directions as to the preparation of the materials, it may be stated that they are ground in water in a ball mill and their respective particle sizes adjusted by a method of shaking water mixtures and decanting after some definite time interval for sedimenation. This step in the process is repeated several times in the preparation of each ingredient, but always maintaining some predetermined volume for the water mixture.

By way of a specific example of utilizing the invention, one of the phosphor constituents may be blue-emitting silver-activated zinc sulphide. Another phosphor constituent may consist of yellow manganese-activated zinc beryllium silicate. The third, or non-phosphor, constituent may consist of beryllium oxide. The preparation of these materials for a water suspension may be in accordance with the following procedure.

The zinc sulphide is ground for eight hours in a ball mill. Half pint ball mill jars are used. Twenty-five grams of the zinc sulphide and 120 cc. of distilled water are put in the jar with 50 grams of flint balls. After being ground for eight hours the zinc sulphide is put in a bottle and enough distilled water is added to make 500 cc. It is then decanted eight times. The length of time between decanting is two hours. This procedure gets rid of the particles that are too small and would not settle in such a way as to make a uniform screen.

The amount of phosphor per cc. is then determined. About 10 cc. of the suspension is placed in a weighed filter paper. This is dried in an oven at about 120° C. The filter paper and phosphor are then weighed and the number of milligrams per cc. determined. Any concentration desired can be made from this stock solution.

The same procedure is followed in the preparation of the zinc beryllium silicate and beryllium oxide for use in settling with these exceptions: Zinc beryllium silicate—grinding time 16 hours instead of 8 hours—30 grams of the material is used for one batch instead of 25 grams; beryllium oxide—grinding time 4 hours instead of 8 hours—25 grams of the material.

When the several constituents are separately prepared as described, they are suspended in a common water mixture. The time of settling is twenty to thirty minutes for the zinc sulphide, one and one-half to two hours for the zinc beryllium silicate and eight or more hours for the beryllium oxide.

The water mixture may consist of adding enough lithium hydroxide to distilled water to make a 0.1 N solution. A 0.5 N solution of sodium sulphide is made with distilled water. All the materials used must be as pure as can be obtained and great care must be taken to keep everything clean.

A regular screen for a 4" curved face—20 k.v.—may be composed of the following:

| | | |
|---|---|---|
| 62%—zinc sulphide (blue) | mg | 112 |
| 38%—zinc beryllium silicate (yellow) | mg | 68 |
| Beryllium oxide | mg | 8 |
| 0.1 N lithium hydroxide | cc | 5 |
| 0.5 N sodium sulphate | cc | 10 |

Total volume 400 cc. (add distilled water).

A 4" curved face bulb has an area of 80 square cm. The thickness of the several layers of phosphor constituents is controlled by the weight per unit area. Each square cm. should have 2.2 mg. of phosphor on it. Thirty-eight per cent of the phosphor should be zinc beryllium silicate and sixty-two per cent should be zinc sulphide.

The bulb in which the screen is to be settled should be cleaned thoroughly with acid and then rinsed in tap water three times and distilled water three times.

The materials, as described above, are carefully mixed and poured into the bulb through a funnel with a 250 mesh strainer. They are then shaken with an up-and-down motion to avoid swirling, and thereafter are permitted to settle on a table which is free from vibration. Any severe temperature change should be avoided as it disturbs the screen. The respective periods of sedimentation follow the general schedule mentioned above, but since my process may be practiced continuously, the procedure is to permit the screen to settle overnight. After descumming on a descumming table, the bulb is placed securely on a pouring table, and the siphoning operation started. At the same time air is turned on while the bulb is being tilted, until the water line is at the edge of the screen; the tilt is stopped and the siphoning (one drop per second) is continued until the water covers only one-half of the screen. The tilting and siphoning of the bulb may continue to completion in accordance with any approved practice. When the screen is completely dried, the bulb is removed from the pouring table and placed in a drying rack.

It will be seen from the above that a screen settled from a water mixture containing the three named constituents is composed of; first, a layer of zinc sulphide; secondly, a layer of zinc beryllium silicate and finally a top or outer layer of beryllium oxide. It will now be understood by those skilled in the art that by regulating or adjusting the particle size of the constituents composing the luminescent screen, and selecting substances having different densities, the order or sequence of deposition of the several substances may be preselected. With a preselected sequence of deposition the composition of the luminescent screen may be controlled to meet given conditions. Further, the several layers of luminescent materials may have a ratio of thickness with respect to each other, which relation is determined by the desired characteristics of the screen. For example, thickness of the composite screen, as well as the thickness of the several layers, are factors which determine the color of the light as well as the efficiency of light output.

While the invention has been described with particular reference to a cathode ray television tube, it will be appreciated that the resultant screen, characteristic of my process, may be used in oscilloscope tubes, and allied uses.

Variations of the phosphor and non-phosphur constituents used will occur to those skilled in the art. For example, magnesium oxide and aluminum oxide, among others, may be substituted for the beryllium oxide; also substitutions may be made for the phosphor constituents. It is my desire to claim all such variations as come within the spirit of the invention as defined by the appended claims.

What is claimed is:

1. A luminescent screen comprising a foundation, and a single composite layer of material on said foundation, the material in the region nearest to the foundation consisting principally of particles of silver-activated zinc sulphide, the material in a more distant region consisting principally of particles of said sulphide which are smaller than those in the first of said regions intermixed with particles of manganese-activated zinc beryllium silicate, and the material in a region still more distant from said foundation consisting principally of particles of said silicate which are smaller than those in the second of said regions.

2. A luminescent screen comprising a foundation, and a single composite layer of material on said foundation, the material in the region nearest to the foundation consisting principally of particles of silver-activated zinc sulphide, the material in a more distant region consisting principally of particles of said sulphide which are smaller than those in the first of said regions intermixed with particles of manganese-activated zinc beryllium silicate, the material in a region still more distant from said foundation consisting principally of particles of said silicate which are smaller than those in the second of said regions, and the material in the region most distant from said foundation consisting principally of particles of beryllium oxide, the larger particles of said oxide being intimately intermingled with at least the smallest particles of said silicate.

3. A composite luminescent screen comprising a foundation, and a single layer of phosphor material on said foundation, the material in the region nearest to the foundation consisting principally of particles of silver-activated zinc sulphide, the material in a more distant region consisting principally of smaller particles of said sulphide intermixed with particles of manganese-activated zinc beryllium silicate, and the material in a region still more distant consisting principally of smaller particles of said silicate.

4. A composite luminescent screen comprising: a foundation; a single layer of phosphor material on said foundation, the material in the region nearest to the foundation consisting principally of particles of silver-activated zinc sulphide, the material in a more distant region consisting principally of smaller particles of said sulphide intermixed with particles of manganese-activated zinc beryllium silicate, the material in a region still more distant consisting principally of smaller particles of said silicate; and a non-phosphor layer on said phosphor layer, said non-phosphor layer being composed principally of particles of beryllium oxide, the larger particles of said oxide being intimately intermingled with at least the smallest particles of said silicate.

5. A composite luminescent screen comprising a foundation, and a single layer of phosphor material on said foundation, the material of said layer in the region nearest to the foundation consisting principally of particles of a phosphor having a predetermined spectral characteristic, the material of said layer in a more distant region consisting principally of smaller particles of said phosphor intermixed with particles of a second phosphor having a different predetermined spectral characteristic, and the material of the layer in a region still more distant consisting principally of smaller particles of said second phosphor.

GUSTAVE LEVY.

REFERENCES CITED

The following references are of record in the file of this patent:

UNITED STATES PATENTS

| Number | Name | Date |
| --- | --- | --- |
| 2,062,858 | Batchelor | Dec. 1, 1936 |
| 2,072,115 | Leverenz | Mar. 2, 1937 |
| 2,161,458 | De Boer et al. | June 6, 1939 |
| 2,181,305 | Myers | Nov. 28, 1939 |
| 2,233,786 | Law | Mar. 4, 1941 |
| 2,303,563 | Law | Dec. 1, 1942 |
| 2,435,436 | Fonda | Feb. 3, 1948 |